US006212163B1

(12) United States Patent
Aida (10) Patent No.: US 6,212,163 B1
(45) Date of Patent: Apr. 3, 2001

(54) METHOD AND DEVICE FOR MULTI-CLASS ATM CONNECTION ADMISSION CONTROL

(75) Inventor: Masaki Aida, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 08/877,373

(22) Filed: Jun. 17, 1997

(30) Foreign Application Priority Data

Jun. 18, 1996 (JP) ..................................... 8-157269

(51) Int. Cl.[7] ....................................... H04J 3/14

(52) U.S. Cl. ........................................ 370/230; 370/395

(58) Field of Search .................................. 370/229, 230, 370/231, 232, 233, 234, 235, 236, 237, 252, 395, 396, 397, 398, 399

(56) References Cited

U.S. PATENT DOCUMENTS

| 5,267,232 | * | 11/1993 | Katsube et al. | 370/17 |
|---|---|---|---|---|
| 5,357,507 | * | 10/1994 | Hughes et al. | 370/60 |
| 5,530,695 | * | 6/1996 | Dighe et al. | 370/17 |
| 5,581,544 | * | 12/1996 | Hamada et al. | 370/253 |
| 5,691,975 | * | 11/1997 | Hamada et al. | 370/232 |
| 5,784,358 | * | 7/1998 | Smith et al. | 370/230 |
| 5,862,126 | * | 1/1999 | Shah et al. | 370/230 |

OTHER PUBLICATIONS

Hiroshi Saito, "Hybrid Connection Admission Control in ATM Networks," Discovering a New World of Communications, Supercomm/International Conference on Communications '92, Chicago, Illinois, vol. 2, Jun. 14, 1992, pp. 699–703.

Sugih Jamin et al., "A Measure–based Admission Control Algorithm for Integrated Services Packet Networks," 8282 Computer Communications Review, vol. 25, No. 4, Oct. 1, 1995, pp. 2–13.

Yasushi Takagi et al., "Priority Assignment Control of ATM Line Buffers with Multiple QOS Classes," IEEE Journal on Selected Areas in Communications, vol. 9, No. 7, Sep. 1991, pp. 1078–1092.

Lily Cheng et al., "A Connection Admission Control Algorithm Based on Empirical Traffic Measurements," Communications—Gateway to Globalization, Proceedings of the Conference on Communications, Seattle, Washington, vol. 2, Jun. 18, 1995, pp. 793–797.

Masaki Aida et al., "Efficient Cell–Loss Ratio Estimation for Real–Time CAC Decisions," IEICE Transactions on Communications, vol. E79–B, No. 2, Feb. 1996, pp. 108–115.

* cited by examiner

*Primary Examiner*—Huy D. Vu
*Assistant Examiner*—Man Phan
(74) *Attorney, Agent, or Firm*—Finnegan, Henderson, Farabow, Garrett, & Dunner, L.L.P.

(57) ABSTRACT

The object of the present invention is to offer a method and device for connection admission control capable of handling a plurality of service categories simultaneously without forfeiting the real-time processing of conventional connection admission control methods. The present invention receives a connection request for a call belonging to one of a plurality of service categories with assigned priority levels; classifies the received connection request based on a service category requested by the connection request; evaluates a quality of service of the service category requested by the connection request and evaluates a quality of service of each other service category, when assuming that the received connection request has been admitted; determines whether or not to admit the received connection request based on results of the evaluations; and permits cells of the call to be stored in a buffer when the connection request for the call has been determined to be admitted.

8 Claims, 8 Drawing Sheets

Prior Art

FIG. 8

Prior Art

METHOD AND DEVICE FOR MULTI-CLASS ATM CONNECTION ADMISSION CONTROL

BACKGROUND OF THE INVENTION

1. Technical Field of the Invention

The present invention relates to a method and device for connection admission control in ATM networks for determining whether calls may be connected by estimating cell loss ratios based on traffic parameters specified by users.

2. Background Art

In ATM networks, a number of service categories are available for responding to traffic having different properties (transmission speed, quality of service, etc.). Therefore, a connection admission control method which assumes the presence of a plurality of service categories is required.

As methods for connection admission control for determining whether calls may be connected based on traffic parameters specified by users, there are techniques wherein specific Quality of Service (QoS) requirements are fulfilled. These QoS requirements, for example, may be determined by cell loss ratios relating to the virtual paths (VPs) containing the calls.

As examples of connection admission control methods which perform processing in real-time, connection admission control methods which can be applied to a single service category (especially those assuming Variable Bit Rate) are commonly known. In these methods, traffic parameters (peak cell rate and sustainable cell rate) reported from users are taken as inputs, and connection admission processing is performed within a standard period of time without depending on the number of calls or the traffic conditions. These methods are applied for each VP, and are carried out in the connection admission control section 1' shown in FIG. 7 by means of the flow procedure shown in FIG. 8. Hereinbelow, this method will be explained in detail.

(1) In order to process call connections in real-time, the parameter N for the number of iterations is predetermined so that a single connection admission procedure is completed in a specific period of time.

(2) For each VP, an identifier i (i=1, 2, . . . , number of already set up connections+1) is provided for every user which has already been assigned a call or for which there has been a new call set-up request in the VP. A user i which issues a new call set-up request reports the peak cell rate $r_i$ (1/sec), the sustainable cell rate $a_i$ (1/sec) and the specified cell loss ratio value to the connection admission control section 1' (see FIG. 7).

Figure 8:
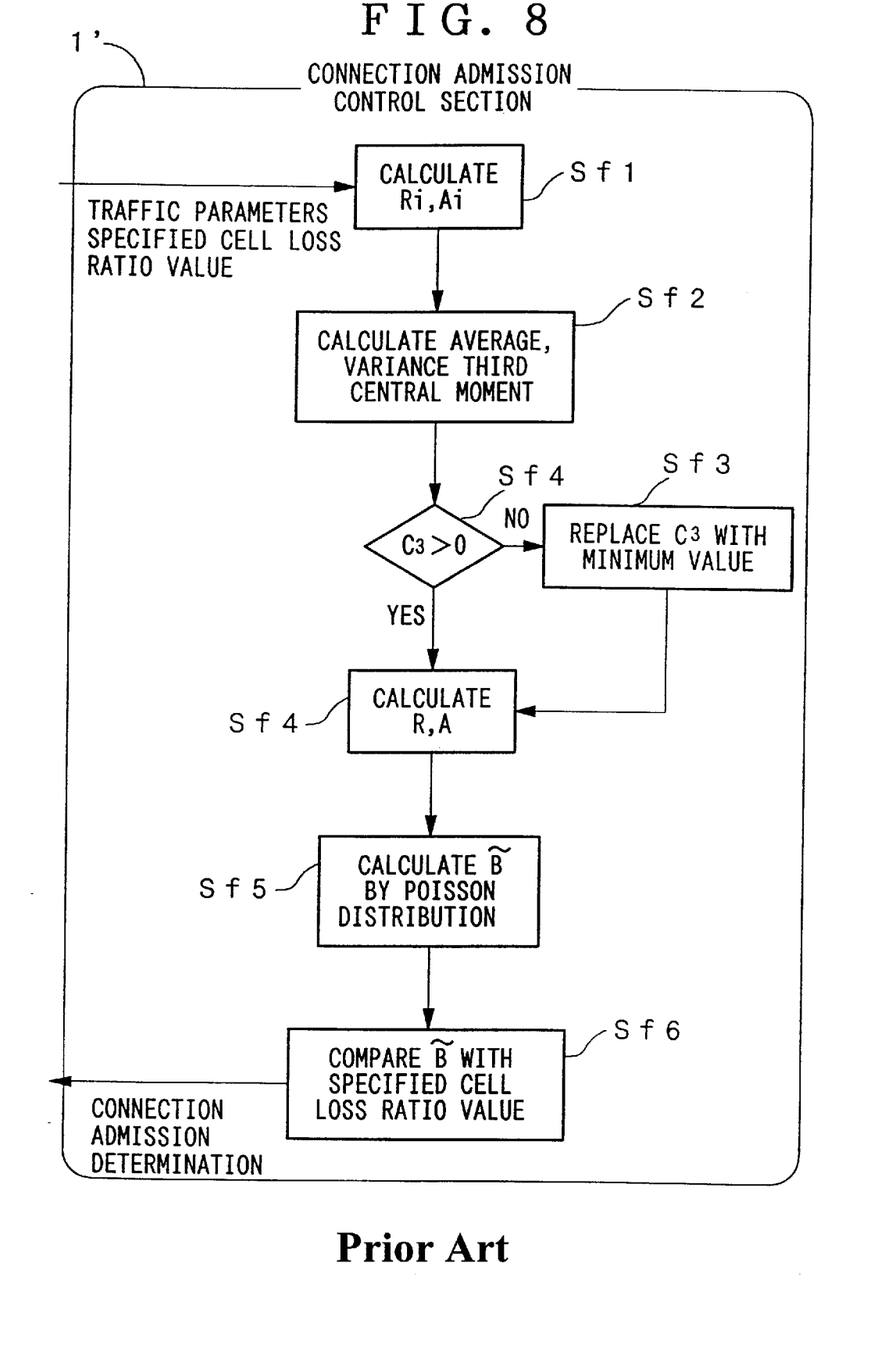
FIG. 8 is a flow chart showing an example of a process performed by a conventional connection admission control section 1'.

(3) The connection admission control section 1' determines the maximum number of cell arrivals $R_i$ and the average number of cell arrivals $A_i$ in a time interval which is a constant γ times the time period required for the VP to transfer a single cell according to the following formulas (step Sf1) based on a peak cell rate and sustainable cell rate reported by the user.

$$R_i = INT\left(\frac{\gamma \cdot L \cdot r_i}{C}\right)$$

$$A_i = \frac{\gamma \cdot L \cdot a_i}{C}$$

Here, INT(x) is a function for the minimum integer greater than or equal to x. L represents the cell length (bit/cell). C represents the VP capacity (transmission speed in bit/sec). γ represents a constant (cells) which depends on the output buffer capacity K of the multiplexing device.

(4) The average $C_1$, variance $C_2$ and third central moment $C_3$ of the distribution of the number of cell arrivals for traffic in the case of assuming that a connection has been admitted for a new call set-up request are determined by the following formulas (step Sf2).

$$C_1 = \sum_{i=1}^{n} A_i$$

$$C_2 = \sum_{i=1}^{n} A_i \cdot (R_i - A_i)$$

$$C_3 = \sum_{i=1}^{n} A_i \cdot (R_i - A_i) \cdot (R_i - 2A_i)$$

Here, n denotes the number of connections both already set-up and required to be set-up.

(5) If for a pre-determined parameter N denoting the number of iterations, the third central moment $C_3$ satisfies the following inequality:

$$C_3 < \frac{-C_2 \cdot X(N) \cdot (\gamma - C_1) + \sqrt{\{C_2 \cdot X(N) \cdot (\gamma - C_1)\}^2 + 4 \cdot X(N) \cdot (1 - X(N)) \cdot C_2^3 \cdot (N+1)}}{2 \cdot X(N) \cdot (N+1)}$$

wherein $$X(N) = 1 - \frac{1 + \sqrt{3 - 2/N}}{N - 1}$$

then the third central moment $C_3$ may be redefined, as a corrected value, to the following (step Sf3):

$$C_3 = \frac{-C_2 \cdot X(N) \cdot (\gamma - C_1) + \sqrt{\{C_2 \cdot X(N) \cdot (\gamma - C_1)\}^2 + 4 \cdot X(N) \cdot (1 - X(N)) \cdot C_2^3 \cdot (N+1)}}{2 \cdot X(N) \cdot (N+1)}$$

(6) R and A are determined by the following formulas (step Sf4).

$$R = \frac{C_3}{C_2}$$

-continued $$A = \frac{C_2^2}{C_3}$$

(7) The estimated cell loss ratio value *B is determined by the following equation (step Sf5).

$$^*B = \frac{1}{C_1} \sum_{k=0}^{N-1} \max(0, k \cdot R + \delta A - \gamma) \cdot (^*p(kR))$$

In this case, when k=0, 1, 2, . . . , then $$^*p(kR) = \exp\left(-\frac{A}{R}\right) \cdot \left\{\frac{(A/R)^k}{k!}\right\}$$

otherwise,

*p(kR)=0

The amount of time required for this calculation does not depend on the number of types of calls or the number of calls, and is completely determined by the pre-determined parameter N which is the number of iterations. According to this calculation, a sufficiently precise value for the cell loss ratio estimate *B can be obtained.

(8) The connection admission control section 1' compares the above-mentioned cell loss ratio estimate *B with the specified cell loss ratio reported for the "relevant call" and "all calls already set-up in the VP in which the call is to be set-up". Then, as a result of the comparison, when the above-mentioned cell loss estimate *B is less than any of the specified cell loss values, the call for which connection has been requested is determined to be connectable (step Sf6). If not, the call connection is determined to be impermissible. Then, the results are reported to the users (see FIG. 7).

(9) When connection is determined to be possible in all of the VPs through which the call passes, then the connection of the call is permitted.

According to the above procedure, it is possible to perform connection admission control of a call within a pre-determined time period.

The above-mentioned conventional art does not perform convolution calculations which depend on the number of connections and the number of types of calls. For this reason, the calculation time is determined solely by the pre-determined parameter N denoting the number of iterations and it is possible to determine the cell loss ratio estimates *B based on calculated amounts which do not depend on the VC numbers or VC classification numbers, so as to achieve real-time connection admission control which satisfies the communication QoS requirements determined by the cell loss ratios.

However, in actual practice, connection admission processing must be capable of handling a plurality of service categories, and connection admission control methods responsive to only a single class (such as only VBR) are inadequate. In ATM networks, traffic of different service categories shares the transmission paths, so that the behavior of traffic belonging to on one service category may have an adverse influence on traffic belonging to another service category. Hence, it is not suitable to determine whether or not to allow a call to be connected independently by the service category. Therefore, there has been a demand for a multi-class connection admission control method which determines whether or not to allow a call to be connected while simultaneously predicting the influence on the QoS of a plurality of service categories.

SUMMARY OF THE INVENTION

In order to resolve the above-mentioned problems, the present invention has the object of offering a method and device for connection admission control capable of handling a plurality of service categories simultaneously without sacrificing the real-time processing of conventional connection admission control methods.

The present invention receives a connection request for a call belonging to one of a plurality of service categories with assigned priority levels; classifies the received connection request based on a service category requested by the connection request; evaluates, for each service category, the change in quality of service between the service category requested by the connection request and the service categories which lower priority levels than that service category when assuming that the received connection request has been admitted; based on the results of the evaluation, determines whether or not to allow the connection of the received connection request; and for the calls of connection requests which have been determined to be admissible, permits the cells of those calls to be stored in buffers which are respectively provided for each service category and which perform cell transmissions on the basis of the rule that cells of lower priority levels are not transmitted as long as all of the cells of service categories of higher priority levels have not been transmitted.

According to the present invention, the admissibility of connection of a call belonging to a service category is determined by considering not only the QoS of that service category but also the influence on the QoS of other service categories. Additionally, the judgment process does not depend on the number of calls for which connection is requested, and is completed in a standard amount of time. As a result, connection admission control of calls which can handle a plurality of service categories and can be processed in real-time is possible.

PREFERRED EMBODIMENTS OF THE INVENTION

Hereinbelow, a first embodiment of the present invention shall be explained with reference to the drawings.

§1. Outline

In the present embodiment, CBR, Real-time VBR (RtVBR), Non-real-time VBR (NrtVBR), Best Effort Class (ABR, UBR) are assumed as service categories. Of course, the types of service categories applicable to the present invention are not restricted to those in the present embodiment, and the expansion to other variations is easily done. Additionally, the traffic parameters of the CBR and Best Effort Class categories are only the peak cell rate. On the other hand, the traffic parameters in the RtVBR and NrtVBR categories are the peak cell rate and the sustainable cell rate.

Figure 1:
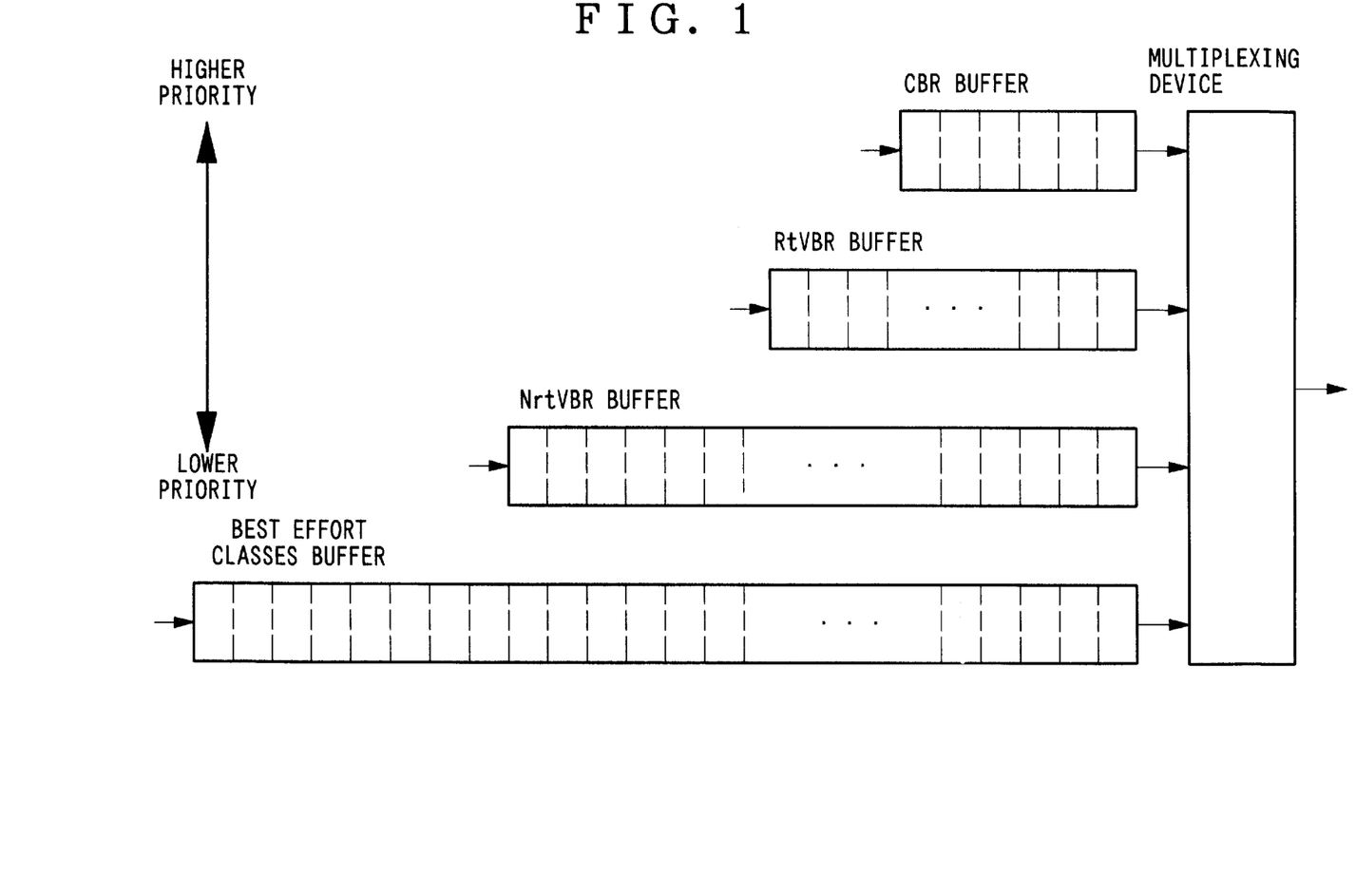
FIG. 1 is a block diagram showing an example of the structure of an output buffer provided in an ATM exchanger according to an embodiment of the present invention.

The cells inputted from the call sources belonging to these service categories are inputted into buffers which are provided for each service category in the ATM exchanger (see FIG. 1). The structure of the buffers is not restricted to that of FIG. 1, and may be designed according to the types of service categories. Each buffer is assigned a priority ranking for cell transfer. The priority ranking may be, for example, in the order of higher priority, CBR, RtVBR, NrtVBR, Best Effort Class. Cells which are present in a buffer are transferred as long as there are no cells present in buffers having higher priority than that buffer.

As a result, traffic belonging to some service category will not affect the QoS evaluations for traffic belonging to service categories of higher priority. Conversely, high priority traffic affects lower priority traffic. Hence, connection admission processing of calls for traffic of high priority must be performed in consideration of the influence on the QoS of lower priority traffic. Additionally, in order to predict whether or not there will be an influence, QoS evaluation techniques are required for each service category.

The present invention performs connection admission control of calls in a plurality of service categories in real-time. The present invention is based on the following art.

1. In the ATM exchanger, a buffer is provided for each service category (FIG. 1). Then, the priority level for cell transfer is assigned between the buffers. Cell transfer in a buffer belonging to a service category is performed only when no cells are present in any of the buffers having higher priority than that buffer.

As a result, the behavior of each service category can be prevented from influencing the QoS of service categories which are of higher priority than that service category. Consequently, QoS evaluation processing of service categories is made possible simply by considering the influence on the QoS of service categories of priority levels lower than those service categories.

2. Using conventional connection admission control methods (connection admission control methods responsive to a single class), QoS evaluation processing is performed for each service category. As a result, it is possible to perform QoS evaluation processing by the service category in real-time.

Specifically, this technique involves using a conventional connection admission control method to make real-time evaluations of the cell loss ratios for traffic wherein calls of a plurality of service categories are multiplexed, after which the cell loss ratio is evaluated for a low priority service category while assuming that all of the lost cells belong to the low priority service category.

3. When a call assignment request belonging to some service category is received, the QoS of that service category and service categories of lower priority levels are evaluated according to the service category using the QoS evaluation technique according to the service category as described in the above paragraph 2, and the assignment request is admitted only when all of the QoS evaluation values fulfill the specified values.

As a result, it is possible to perform connection admission control of a plurality of service categories while considering the influence on the QoS of each VP for connections which have already been assigned.

§2. Embodiments

Hereinbelow, at ATM connection admission control method according to an embodiment of the present invention shall be explained.

Figure 2:
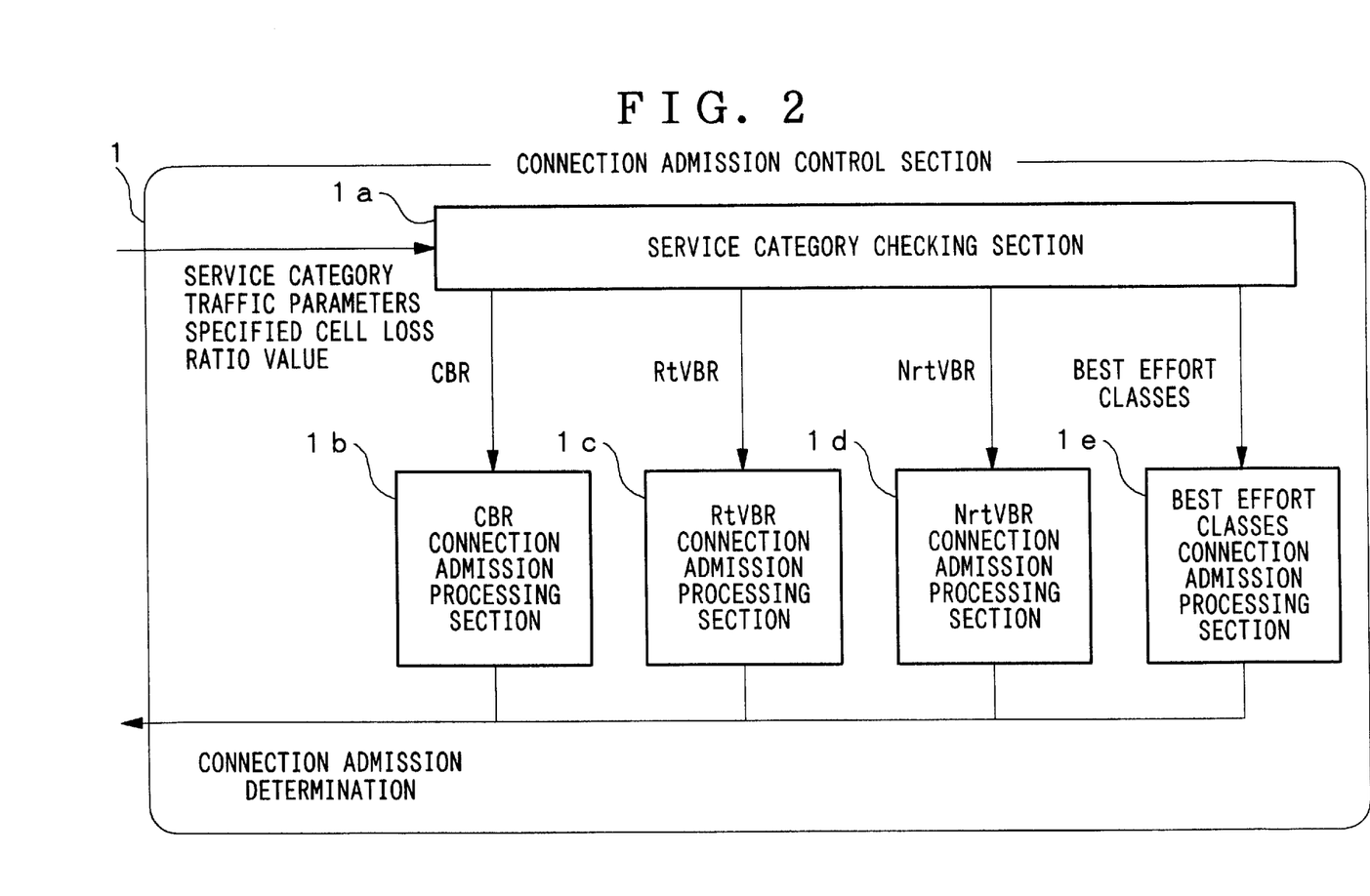
FIG. 2 is a block diagram showing an example of the structure of a connection admission control section 1 according to the same embodiment.
Figure 7:
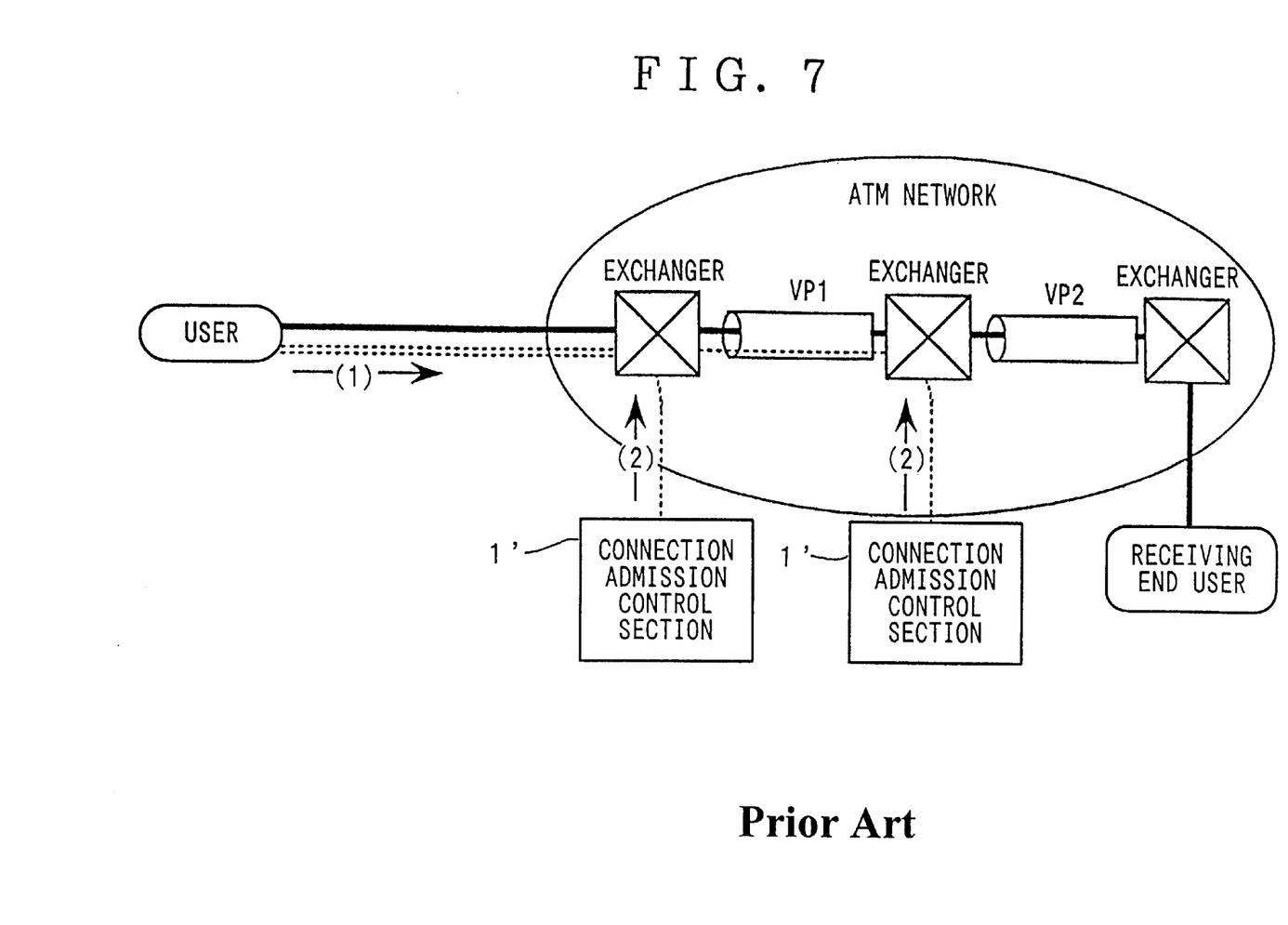
FIG. 7 is a block diagram showing an example of an ATM network using a conventional connection admission control section 1'.

In the present embodiment, a connection admission section 1 is used instead of the conventional connection admission section 1' in an ATM network such as shown in FIG. 7. FIG. 2 is a block diagram showing an example of the structure of a connection admission control section 1. The connection admission control section 1 adds the control function of controlling the buffers as shown in FIG. 1 to the conventional connection admission section 1'. The present ATM connection admission control method is applied for each VP by means of the connection admission control section 1.

With this type of structure, the connection admission control method due to the present invention is performed by the following procedure.

1. In order to process the connection of calls in real-time, the number of iterations N which are allowable for cell loss ratio evaluation processing in the VP is determined beforehand.

2. For each VP, all of the users for which connection to the VP has already been assigned and users for which new call connection requests have been issued are given an identifier i (i=1, 2, . . . , number of already set-up connections+1).

When requesting the assignment of a call, a user i which has issued a new call connection request reports the desired category (CBR, RtVBR, NrtVBR, Best Effort Classes), the peak cell rate $r_i$ (1/sec), the sustained cell rate $a_i$ (1/sec; but only when the desired category is RtVBR or NrtVBR) and the specified cell loss ratio value to the connection admission section 1.

3. A service category check section 1a (see FIG. 2) classifies the calls for which connection requests have issued based on the service categories (CBR, RtVBR, NrtVBR, Best Effort Classes) reported by the user, and turns the call over to the corresponding connection admission processing section.

4. Each connection admission processing section 1b–1e performs the following connection procedures and issues notification of whether or not connection has been allowed.

5. When connection is determined to be allowable for all VPs in which the call is contained, the connection of the call is permitted.

Next, the procedure of the above paragraph 4 (connection procedures for connection admission processing sections 1b–1e) shall be explained separately.

(1) Procedure of CBR Connection Admission Processing Section 1b

Figure 3:
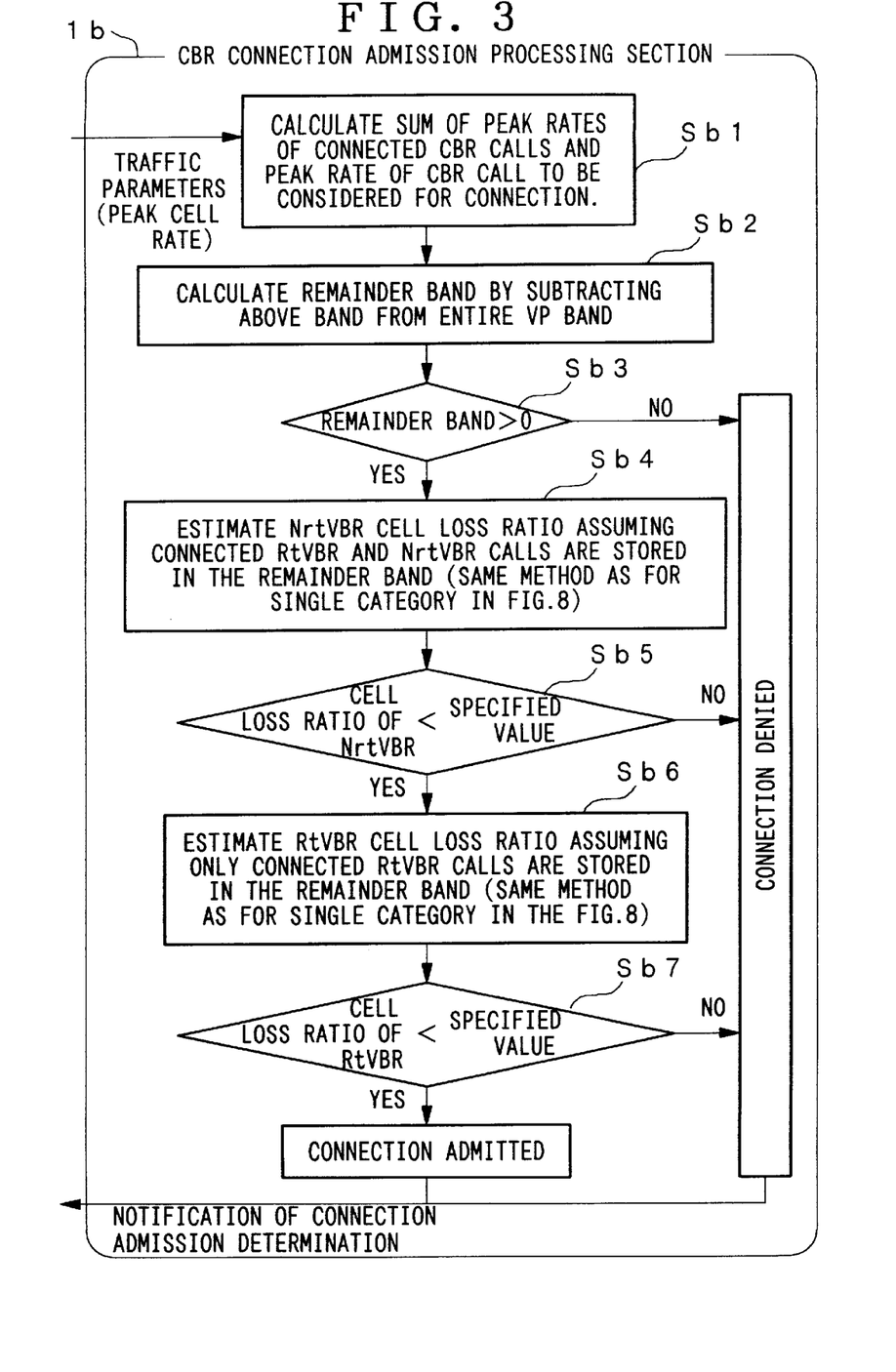
FIG. 3 is a flow chart showing an example of a process performed by a CBR connection admission processing section 1b.

The CBR connection admission section 1b performs the following procedure (see FIG. 3).

1. (sum of peak cell rates of connected CBR calls)+(peak cell rate of CBR call to be judged for connectability) is calculated (step Sb1).

2. The band resulting by subtracting the above-mentioned band (i.e. the results of step Sb1) from the entire VP band is calculated and the result is defined to be the remainder band Z (step Sb2).

3. If the remainder band Z is positive, then the procedure advances to step Sb4; if not, then a connection denial notification is issued and the procedure is terminated (step Sb3).

4. The cell loss ratio $B_{nrt}$ for only NrtVBR is estimated under the assumption that only the connected RtVBR calls and NrtVBR calls are contained in the remainder band Z (step Sb4). The procedure is as follows:

The following amounts are calculated for all connected RtVBR calls and NrtVBR calls based on the peak cell rate and sustained cell rate of these calls.

$$R_i = INT\left(\frac{\gamma \cdot L \cdot r_i}{C}\right)$$

$$A_i = \frac{\gamma \cdot L \cdot a_i}{C}$$

Here, INT(x) is a function for the minimum integer greater than or equal to x. L represents the cell length (bit/cell). C represents the VP capacity (transmission speed in bit/sec). γ represents a constant (cells) which depends on the output buffer capacity K of the multiplexing device.

Next, the following value Γ is calculated.

$$\Gamma = \frac{\gamma \cdot Z}{C}$$

The cell loss ratio estimate *B is calculated by applying $R_i$, $A_i$ and Γ to a conventional connection admission method (connection admission method responsive to a single class) according to the following formula (see steps Sf2–Sf5 in FIG. 8):

$$^*B = \frac{1}{C_1} \sum_{k=0}^{N-1} \max(0, k \cdot R + \delta A - \Gamma) \cdot (^*p(kR))$$

The cell loss estimate *B is the cell loss ratio for the mixed traffic of RtVBR and NrtVBR. Therefore, in order to estimate the cell loss ratio $B_{nrt}$ of only NrtVBR, then it is assumed that cell loss arises in all NrtVBR cells, and the following calculation is performed:

$$B_{nrt} = (^*B) \cdot \frac{\sum_{i \in RtVBR} a_i + \sum_{i \in NrtVBR} a_i}{\sum_{i \in NrtVBR} a_i}$$

5. If the above-mentioned cell loss ratio $B_{nrt}$ for only NrtVBR is less than or equal to the predetermined value, the procedure advances to step Sb6; if not, a connection denial notification is issued and the procedure is terminated (step Sb5).

6. Assuming that only the connected RtVBR calls are contained in the above-mentioned remainder band Z, the cell loss ratio $B_{rt}$ of only RtVBR is estimated (step Sb6). The procedure is as follows.

The following amounts are calculated for all connected RtVBR calls based on the peak cell rate and sustained cell rate of these calls.

$$R_i = INT\left(\frac{\gamma \cdot L \cdot r_i}{C}\right)$$

$$A_i = \frac{\gamma \cdot L \cdot a_i}{C}$$

Here, INT(x) is a function for the minimum integer greater than or equal to x. L represents the cell length (bit/cell). C represents the VP capacity (transmission speed in bit/sec). γ represents a constant (cells) which depends on the output buffer capacity K of the multiplexing device.

Next, the following value Γ is calculated.

$$C_1 = \sum_{i=1}^{n} A_i$$

$$C_2 = \sum_{i=1}^{n} A_i \cdot (R_i - A_i)$$

$$C_3 = \sum_{i=1}^{n} A_i \cdot (R_i - A_i) \cdot (R_i - 2A_i)$$

The cell loss ratio estimate *B is calculated by applying $R_i$, $A_i$ and Γ to a conventional connection admission method (connection admission method responsive to a single class) according to the following formula (see steps Sf2–Sf5 in FIG. 8):

$$^*B = \frac{1}{C_1} \sum_{k=0}^{N-1} \max(0, k \cdot R + \delta A - \Gamma) \cdot (^*p(kR))$$

The above-mentioned cell loss ratio estimate *B is taken to be the cell loss ratio $B_{rt}$ for only RtVBR.

$$B_{rt} = {^*B}$$

7. If the above-mentioned cell loss ratio $B_{rt}$ for only RtVBR is less than or equal to the predetermined value, then a connection admission notification is issued for the CBR call for which connection was requested. If not, a connection denial notification is issued (step Sb7).

8. The connection of the call is permitted when connection is determined to be allowable in all of the VPs through which the call passes.

(2) Procedure of RtVBR Connection Admission Processing Section 1c

Figure 4:
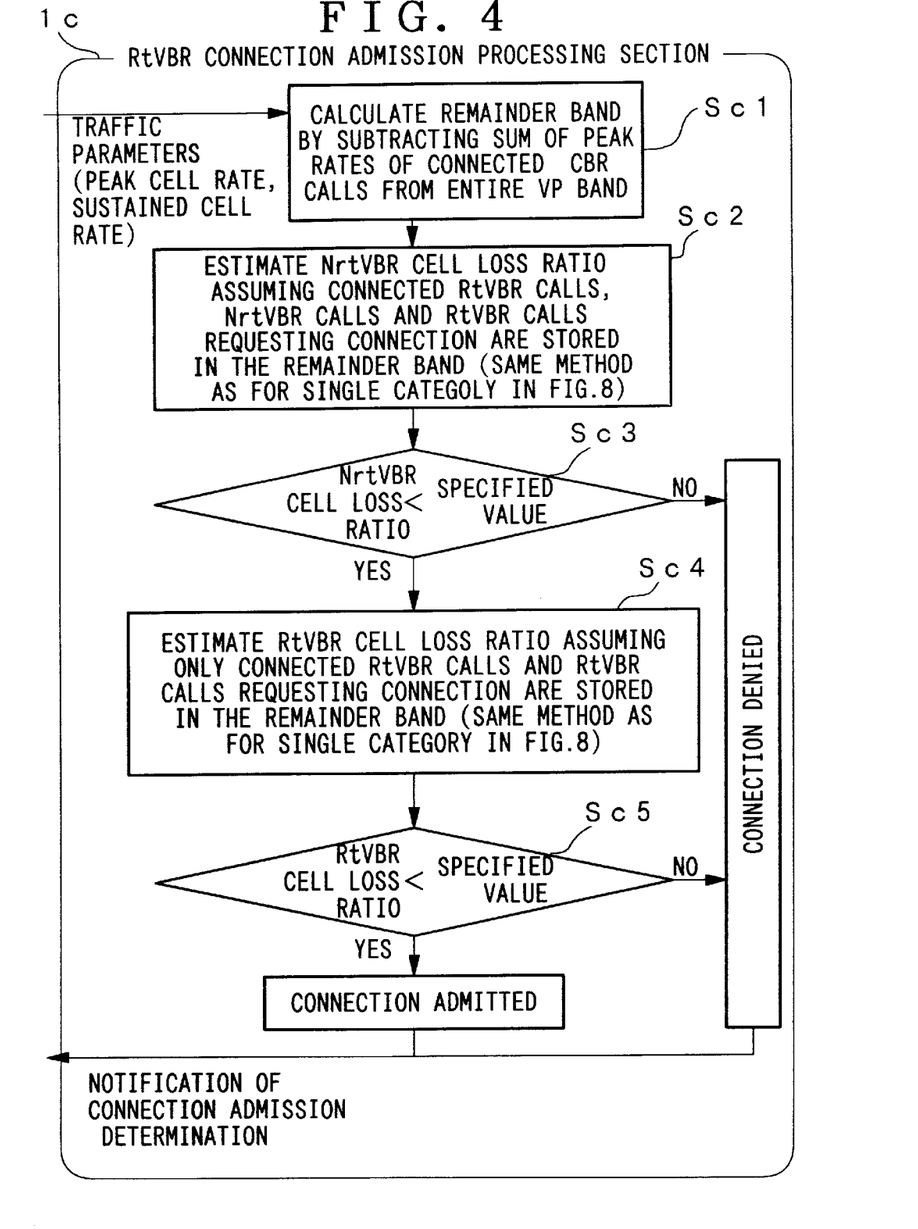
FIG. 4 is a flow chart showing an example of a process performed by a RtVBR connection admission processing section 1c.

The RtVBR connection admission processing section 1c performs the following procedure (see FIG. 4).

1. The band resulting by subtracting the band corresponding to the sum of peak cell rates of connected CBR calls from the entire VP band is calculated and the result is defined to be the remainder band Z (step Sc1).

2. The cell loss ratio $B_{nrt}$ for only NrtVBR is estimated under the assumption that only the connected RtVBR calls, NrtVBR calls and RtVBR for which connection requests have issued are contained in the remainder band Z (step Sc2). The procedure is as follows:

The following amounts are calculated for all connected RtVBR calls, NrtVBR calls and RtVBR calls for which connection requests have issued based on the peak cell ate and sustained cell rate of these calls.

$$R_i = INT\left(\frac{\gamma \cdot L \cdot r_i}{C}\right)$$

$$A_i = \frac{\gamma \cdot L \cdot a_i}{C}$$

Here, INT(x) is a function for the minimum integer greater than or equal to x. L represents the cell length (bit/cell). C represents the VP capacity (transmission speed in bit/sec). γ represents a constant (cells) which depends on the output buffer capacity K of the multiplexing device.

Next, the following value Γ is calculated.

$$\Gamma = \frac{\gamma \cdot Z}{C}$$

The cell loss ratio estimate *B is calculated by applying $R_i$, $A_i$ and Γ to a conventional connection admission method (connection admission method responsive to a single class) according to the following formula (see steps Sf2–Sf5 in FIG. 8):

$$^*B = \frac{1}{C_1}\sum_{k=0}^{N-1} \max(0, k \cdot R + \delta A - \Gamma) \cdot (^*p(kR))$$

The cell loss estimate *B is the cell loss ratio for the mixed traffic of RtVBR and NrtVBR. Therefore, in order to estimate the cell loss ratio $B_{nrt}$ of only NrtVBR, then it is assumed that cell loss arises in all NrtVBR cells, and the following calculation is performed:

$$B_{nrt} = (^*B) \cdot \frac{\sum_{i \in RtVBR} a_i + a' + \sum_{i \in NrtVBR} a_i}{\sum_{i \in NrtVBR} a_i}$$

Here, a' denotes the sustained cell rate for RtVBR calls for which connection requests have been issued.

3. If the above-mentioned cell loss ratio $B_{nrt}$ for only NrtVBR is less than or equal to the predetermined value, the procedure advances to step Sc4; if not, a connection denial notification is issued and the procedure is terminated (step Sc3).

4. Assuming that only the connected RtVBR calls and the RtVBR calls for which connection requests have issued are contained in the above-mentioned remainder band Z, the cell loss ratio $B_{rt}$ of only RtVBR is estimated (step Sc4) The procedure is as follows.

The following amounts are calculated for all connected RtVBR calls and Rt VBR calls for which connection requests have issued based on the peak cell rate and sustained cell rate of these calls.

$$R_i = INT\left(\frac{\gamma \cdot L \cdot r_i}{C}\right)$$

$$A_i = \frac{\gamma \cdot L \cdot a_i}{C}$$

Here, INT(x) is a function for the minimum integer greater than or equal to x. L represents the cell length (bit/cell). C represents the VP capacity (transmission speed in bit/sec). γ represents a constant (cells) which depends on the output buffer capacity K of the multiplexing device.

Next, the following value Γ is calculated.

$$\Gamma = \frac{\gamma \cdot Z}{C}$$

The cell loss ratio estimate *B is calculated by applying $R_i$, $A_i$ and Γ to a conventional connection admission method (connection admission method responsive to a single class) according to the following formula (see steps Sf2–Sf5 in FIG. 8):

$$^*B = \frac{1}{C_1}\sum_{k=0}^{N-1} \max(0, k \cdot R + \delta A - \Gamma) \cdot (^*p(kR))$$

The above-mentioned cell loss ratio estimate *B is taken to be the cell loss ratio $B_{rt}$ for only RtVBR.

$B_{rt}$=*B

5. If the above-mentioned cell loss ratio $B_{rt}$ for only RtVBR is less than or equal to the predetermined value, then a connection admission notification is issued for the RtVBR call for which connection was requested. If not, a connection denial notification is issued (step Sc5).

6. The connection of the call is permitted when connection is determined to be allowable in all of the VPs through which the call passes.

(3) Procedure of NrtVBR Connection Admission Processing Section 1d

Figure 5:
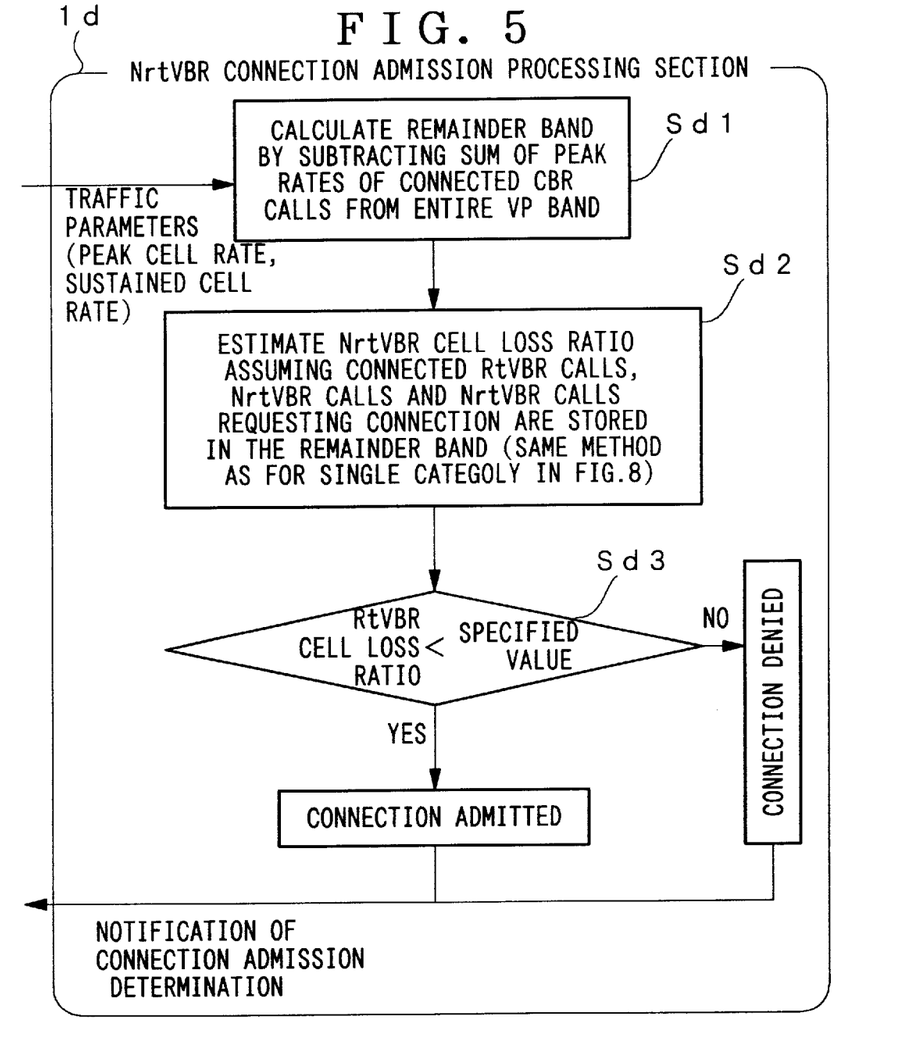
FIG. 5 is a flow chart showing an example of a process performed by a NrtVBR connection admission processing section 1d.

The RtVBR connection admission processing section 1d performs the following procedure (see FIG. 5).

1. The band resulting by subtracting the band corresponding to the sum of peak cell rates of connected CBR calls from the entire VP band is calculated and the result is defined to be the remainder band Z (step Sd1).

2. The cell loss ratio $B_{nrt}$ for only NrtVBR is estimated under the assumption that only the connected RtVBR calls, NrtVBR calls and NrtVBR for which connection requests have issued are contained in the remainder band Z (step Sd2). The procedure is as follows:

The following amounts are calculated for all connected RtVBR calls, NrtVBR calls and NrtVBR calls for which connection requests have issued based on the peak cell rate and sustained cell rate of these calls.

$$R_i = INT\left(\frac{\gamma \cdot L \cdot r_i}{C}\right)$$

$$A_i = \frac{\gamma \cdot L \cdot a_i}{C}$$

Here, INT(x) is a function for the minimum integer greater than or equal to x. L represents the cell length (bit/cell). C represents the VP capacity (transmission speed in bit/sec). γ represents a constant (cells) which depends on the output buffer capacity K of the multiplexing device.

Next, the following value Γ is calculated.

$$\Gamma = \frac{\gamma \cdot Z}{C}$$

The cell loss ratio estimate *B is calculated by applying $R_i$, $A_i$ and Γ to a conventional connection admission method (connection admission method responsive to a single class) according to the following formula (see steps Sf2_–Sf5 in FIG. 8):

$$^*B = \frac{1}{C_1} \sum_{k=0}^{N-1} \max(0, k \cdot R + \delta A - \Gamma) \cdot (^*p(kR))$$

The cell loss estimate *B is the cell loss ratio for the mixed traffic of RtVBR and NrtVBR. Therefore, in order to estimate the cell loss ratio $B_{nrt}$ of only NrtVBR, the following calculation is performed:

$$B_{nrt} = (^*B) \cdot \frac{\sum_{i \in RtVBR} a_i + a' + \sum_{i \in NrtVBR} a_i}{\sum_{i \in NrtVBR} a_i}$$

Here, a' denotes the sustained cell rate for NrtVBR calls for which connection requests have been issued.

3. If the above-mentioned cell loss ratio $B_{nrt}$ for only NrtVBR is less than or equal to the predetermined value, a connection admission notification is issued. If not, a connection denial notification is issued (step Sd3).

4. The connection of the call is permitted when connection is determined to be allowable in all of the VPs through which the call passes.

(3) Procedure of Best Effort Classes Connection Admission Processing Section 1e

Figure 6:
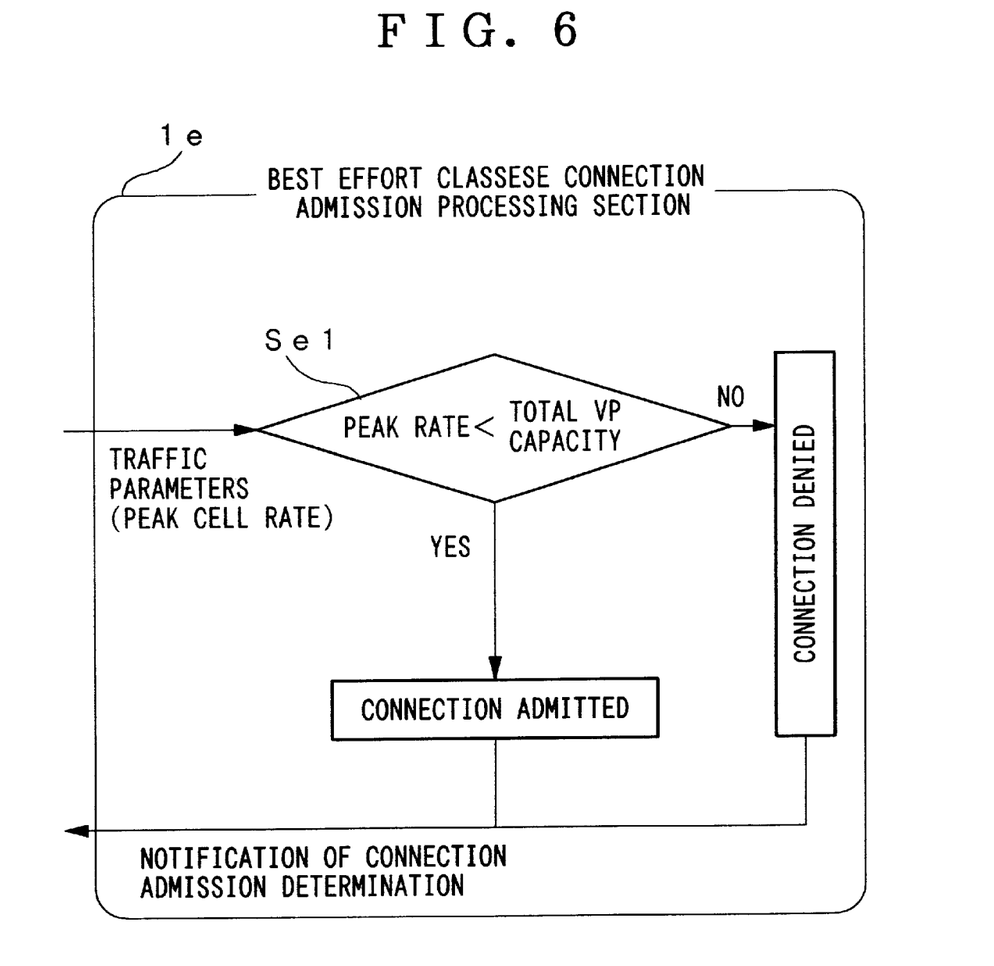
FIG. 6 is a flow chart showing an example of a process performed by a Best Effort Classes connection admission processing section 1e.

The Best Effort Classes connection admission processing section 1e performs the following procedure (see FIG. 6).

1. If the peak cell rate of a Best Effort Classes call for which connection has been requested is less than or equal to the capacity of all VPs, then a connection admission notification is issued for the Best Effort Classes call. If not, a connection denial notification is issued (step Se1).

2. The connection of the call is permitted when connection is determined to be allowable in all of the VPs through which the call passes.

According to the above procedures, connection admission control can be performed with respect to a plurality of service categories without having any detrimental influence on the QoS of other service categories. Furthermore, the processing for connection admission control is completed within a predetermined amount of time.

While an embodiment of the present invention has been explained above with reference to the drawings, the detailed structure is not necessarily restricted to this embodiment, and the scope of the present invention includes any number of modifications to the design as long as they are not such as to run counter to the gist of the present invention.

For example, in the above embodiment, the cell loss ratio estimate *B was calculated by the following equation.

$$^*B = \frac{1}{C_1} \sum_{k=0}^{N-1} \max(0, k \cdot R + \delta A - \Gamma) \cdot (^*p(kR))$$

However, the formula for calculating the cell loss ratio estimate *B is not necessarily restricted to the above equation, and as long as the calculation formula is such as to be capable of estimating the cell loss ratio after connection with respect to a single service category, application is generally possible by combining with the cell transmission method proposed by the present invention, that is, a cell transmission method wherein a buffer is provided for each service category, and the cells of lower priority service categories are not transmitted while cells remain in higher priority service categories. For example, the cell loss ratio estimate *B may also be determined by the following formula.

$$^*B = \frac{\sum_k \max(o, k - \Gamma) \cdot \{p_1 \# p_2 \# \ldots \# p_n\}(k)}{\sum_k k \cdot \{p_1 \# p_2 \# \ldots \# p_n\}(k)}$$

Here, the symbol "#" represents a convolution. Additionally, $p_i(k)$ is the value indicated below.

$$p_i(k) = \begin{cases} 1 - A_i / R_i & k = 0 \\ A_i / R_i & k = R_i \\ 0 & \text{otherwise} \end{cases}$$

I claim:

1. A multi-class ATM connection admission method comprising the steps of:

receiving a connection request for a call belonging to one of a plurality of service categories with assigned priority levels;

classifying the received connection request based on a service category requested by the connection request;

evaluating a quality of service of said service category requested by the connection request and evaluating a quality of service of each other service category, when assuming that the received connection request has been admitted, the evaluating step further comprising the substeps of:

estimating a cell loss ratio for traffic wherein calls of the service category for which the connection request has been received and calls of service categories of lower priority levels are multiplexed, and estimating a cell loss ratio of said service categories of lower priority levels when assuming that all of the lost cells based on the cell loss ratio of said traffic belong to said service categories of lower priority levels;

determining whether or not to admit the received connection request based on results of said evaluations; and permitting cells of said call to be stored in a buffer when the connection request for said call has been determined to be admissible.

2. A multi-class ATM connection admission method comprising the steps of:

receiving a connection request for a call belonging to one of a plurality of service categories with assigned priority levels;

classifying the received connection request based on a service category requested by the connection request;

evaluating a quality of service of said service category requested by the connection request and evaluating a quality of service of each other service category, when assuming that the received connection request has been admitted, the evaluating step further comprising the substeps of:

estimating a cell loss ratio for traffic wherein calls of the service category for which the connection request has been received and calls of service categories of lower priority levels are multiplexed, and estimating a cell loss ratio of said service categories of lower priority levels when assuming that all of the lost cells based on the cell loss ratio of said traffic belong to said service categories of lower priority levels;

determining whether or not to admit the received connection request based on results of said evaluations;

permitting cells of said call to be stored in an appropriate buffer when the connection request for said call has been determined to be admissible, wherein a buffer is provided for each service category and said priority levels are assigned for each buffer; and transferring the cells stored in each buffer over a transmission path only when there are no cells present in any buffers having higher priority levels.

3. A multi-class ATM connection admission method comprising the steps of:

receiving a connection request for a call belonging to one of a plurality of service categories with assigned priority levels;

classifying the received connection request based on a service category requested by the connection request;

evaluating a quality of service of said service category requested by the connection request and evaluating a quality of service of each other service category, when assuming that the received connection request has been admitted, the evaluating step further comprising the substeps of:

estimating a cell loss ratio for traffic wherein calls of the service category for which the connection request has been received and calls of service categories of lower priority levels are multiplexed, and estimating a cell loss ratio of said service categories of lower priority levels when assuming that all of the lost cells based on the cell loss ratio of said traffic belong to said service categories of lower priority levels;

determining the received connection request to be admissible when the cell loss ratio of the service category requested by the received connection request is less than or equal to a specified cell loss ratio reported on the service category, and the cell loss ratio estimated for each of said service categories of lower priority levels is less than or equal to a specified cell loss ratio respectively reported on each service category; and permitting cells of said call to be stored in a buffer when the connection request for said call has been determined to be admissible.

4. A multi-class ATM connection admission method comprising the steps of:

receiving a connection request for a call belonging to one of a plurality of service categories with assigned priority levels;

classifying the received connection request based on a service category requested by the connection request;

evaluating a quality of service of said service category requested by the connection request and evaluating a quality of service of each other service category, when assuming that the received connection request has been admitted, the evaluating step further comprising the substeps of:

estimating a cell loss ratio for traffic wherein calls of the service category for which the connection request has been received and calls of service categories of lower priority levels are multiplexed, and estimating a cell loss ratio of said service categories of lower priority levels when assuming that all of the lost cells based on the cell loss ratio of said traffic belong to said service categories of lower priority levels;

determining the received connection request to be admissible when the cell loss ratio of the service category requested by the received connection request is less than or equal to a specified cell loss ratio reported on the service category, and the cell loss ratio estimated for each of said service categories of lower priority levels is less than or equal to a specified cell loss ratio respectively reported on each service category;

permitting cells of said call to be stored in an appropriate buffer when the connection request for said call has been determined to be admissible, wherein a buffer is provided for each service category and said priority levels are assigned for each buffer; and transferring the cells stored in each buffer over a transmission path only when there are no cells present in any buffers having higher priority levels.

5. A multi-class ATM connection admission device comprising:

receiving means for receiving a connection request for a call belonging to one of a plurality of service categories with assigned priority levels;

classifying means for classifying the received connection request based on a service category requested by the connection request;

evaluating means for evaluating a quality of service of said service category requested by the connection request and evaluating a quality of service of each other service category, when assuming that the received connection request has been admitted, the evaluating means further comprising:

estimating means for estimating a cell loss ratio for traffic wherein calls of the service category for which the connection request has been received and calls of service categories of lower priority levels are multiplexed, and estimating means for estimating a cell loss ratio of said service categories of lower priority levels when assuming that all of the lost cells based on the cell loss ratio of said traffic belong to said service categories of lower priority levels;

determining means for determining whether or not to admit the received connection request based on results of said evaluations; and permission means for permitting cells of said call to be stored in a buffer when the connection request for said call has been determined to be admissible.

6. A multi-class ATM connection admission device comprising:

receiving means for receiving a connection request for a call belonging to one of a plurality of service categories with assigned priority levels;

classifying means for classifying the received connection request based on a service category requested by the connection request;

evaluating means for evaluating a quality of service of said service category requested by the connection request and evaluating a quality of service of each other service category, when assuming that the received connection request has been admitted, the evaluating means further comprising:

estimating means for estimating a cell loss ratio for traffic wherein calls of the service category for which the connection request has been received and calls of service categories of lower priority levels are multiplexed, and estimating means for estimating a cell loss ratio of said service categories of lower priority levels when assuming that all of the lost cells based on the cell loss ratio of said traffic belong to said service categories of lower priority levels;

determining means for determining whether or not to admit the received connection request based on results of said evaluations;

permission means for permitting cells of said call to be stored in an appropriate buffer when the connection request for said call has been determined to be admissible, wherein a buffer is provided for each service category and said priority levels are assigned for each buffer; and transfer means for transferring the cells stored in each buffer over a transmission path only when there are no cells present in any buffers having higher priority levels.

7. A multi-class ATM connection admission device comprising:

receiving means for receiving a connection request for a call belonging to one of a plurality of service categories with assigned priority levels;

classifying means for classifying the received connection request based on a service category requested by the connection request;

evaluating means for evaluating a quality of service of said service category requested by the connection request and evaluating a quality of service of each other service category, when assuming that the received connection request has been admitted, the evaluating means further comprising:

estimating means for estimating a cell loss ratio for traffic wherein calls of the service category for which the connection request has been received and calls of service categories of lower priority levels are multiplexed, and estimating means for estimating a cell loss ratio of said service categories of lower priority levels when assuming that all of the lost cells based on the cell loss ratio of said traffic belong to said service categories of lower priority levels;

determining means for determining that the received connection request is admissible when the cell loss ratio of the service category requested by the received connection request is less than or equal to a specified cell loss ratio reported on the service category, and the cell loss ratio estimated for each of said service categories of lower priority levels is less than or equal to a specified cell loss ratio respectively reported on each service category; and permission means for permitting cells of said call to be stored in a buffer when the connection request for said call has been determined to be admissible.

8. A multi-class ATM connection admission device comprising:

receiving means for receiving a connection request for a call belonging to one of a plurality of service categories with assigned priority levels;

classifying means for classifying the received connection request based on a service category requested by the connection request;

evaluating means for evaluating a quality of service of said service category requested by the connection request and evaluating a quality of service of each other service category, when assuming that the received connection request has been admitted, the evaluating means further comprising:

estimating means for estimating a cell loss ratio for traffic wherein calls of the service category for which the connection request has been received and calls of service categories of lower priority levels are multiplexed, and estimating means for estimating a cell loss ratio of said service categories of lower priority levels when assuming that all of the lost cells based on the cell loss ratio of said traffic belong to said service categories of lower priority levels;

determining means for determining that the received connection request is admissible when the cell loss ratio of the service category requested by the received connection request is less than or equal to a specified cell loss ratio reported on the service category, and the cell loss ratio estimated for each of said service categories of lower priority levels is less than or equal to a specified cell loss ratio respectively reported on each service category;

permission means for permitting cells of said call to be stored in an appropriate buffer when the connection request for said call has been determined to be admissible, wherein a buffer is provided for each service category and said priority levels are assigned for each buffer; and transfer means for transferring the cells stored in each buffer over a transmission path only when there are no cells present in any buffers having higher priority levels.

* * * * *